US006228795B1

(12) United States Patent
Vizzini

(10) Patent No.: US 6,228,795 B1
(45) Date of Patent: *May 8, 2001

(54) POLYMERIC SUPPORTED CATALYSTS

(75) Inventor: James C. Vizzini, Pasadena, TX (US)

(73) Assignee: Exxon Chemical Patents, Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/184,358

(22) Filed: Nov. 2, 1998

Related U.S. Application Data

(63) Continuation-in-part of application No. 09/092,752, filed on Jun. 5, 1998, now Pat. No. 6,100,214
(60) Provisional application No. 60/048,965, filed on Jun. 6, 1997, and provisional application No. 60/079,569, filed on Mar. 27, 1998.

(51) Int. Cl.[7] ............................. B01J 31/00; C08F 4/44; C08F 4/06; C08F 4/72
(52) U.S. Cl. ...................... 502/155; 502/152; 502/158; 526/127; 526/131; 526/170; 526/943
(58) Field of Search ................................. 502/152, 155, 502/158; 526/127, 131, 170

(56) References Cited

U.S. PATENT DOCUMENTS

| | | | |
|---|---|---|---|
| 3,036,048 | 5/1962 | Von Falkai et al. | 502/103 |
| 5,001,205 | 3/1991 | Hoel | 502/117 |
| 5,036,034 | 7/1991 | Ewen | 502/103 |
| 5,057,475 | 10/1991 | Canich et al. | 502/103 |
| 5,198,401 | 3/1993 | Turner et al. | 502/152 |
| 5,206,197 | 4/1993 | Campbell, Jr. | 502/103 |
| 5,288,677 | 2/1994 | Chung et al. | 502/152 |
| 5,296,433 | 3/1994 | Siedel et al. | 502/103 |
| 5,308,816 | 5/1994 | Tsutsui et al. | 502/117 |
| 5,427,991 | 6/1995 | Turner | 502/103 |
| 5,428,120 | 6/1995 | Newman et al. | 526/160 |
| 5,444,134 | 8/1995 | Matsumoto | 526/160 |
| 5,453,410 | 9/1995 | Kolthammer et al. | 502/152 |
| 5,500,398 | 3/1996 | Marks et al. | 502/103 |
| 5,502,017 | 3/1996 | Marks et al. | 502/103 |
| 5,599,761 | 2/1997 | Turner | 502/152 |
| 5,643,847 | 7/1997 | Walzer, Jr. | 502/117 |
| 5,663,249 | 9/1997 | Ewen et al. | 502/152 |
| 5,721,183 | 2/1998 | Neithamer | 502/117 |
| 5,763,547 | 6/1998 | Kolthammer et al. | 526/129 |
| 5,783,512 * | 7/1998 | Jacobsen et al. | 502/155 |
| 5,801,113 * | 9/1998 | Jejelowo et al. | 502/155 |
| 5,834,393 * | 11/1998 | Jacobsen et al. | 502/152 |
| 5,972,823 * | 10/1999 | Walzer, Jr. | 502/152 |
| 6,040,261 * | 3/2000 | Hlatky | 502/155 |
| 6,100,214 * | 8/2000 | Walzer, Jr. et al. | 502/159 |

FOREIGN PATENT DOCUMENTS

| | | |
|---|---|---|
| 2212668 | 2/1998 | (CA) . |
| 0 426 637 | 5/1991 | (EP) . |
| 0 427 697 | 5/1991 | (EP) . |
| 0 520 732 | 12/1992 | (EP) . |
| 0 633 272 | 1/1995 | (EP) . |
| 0 727 443 | 8/1996 | (EP) . |
| 0 767 184 | 4/1997 | (EP) . |
| 0 775 707 * | 5/1997 | (EP) . |
| WO 91/09882 | 7/1991 | (WO) . |
| WO 93/11172 | 6/1993 | (WO) . |
| WO 93/19103 | 9/1993 | (WO) . |
| WO 94/00500 | 1/1994 | (WO) . |
| WO 94/03506 | 2/1994 | (WO) . |
| WO 94/07928 | 4/1994 | (WO) . |
| WO 95/15815 | 6/1995 | (WO) . |
| WO 95/23816 | 9/1995 | (WO) . |
| WO 96/04319 * | 2/1996 | (WO) . |
| WO 96/23005 * | 8/1996 | (WO) . |
| WO 96/28480 * | 9/1996 | (WO) . |
| WO96/40796 | 12/1996 | (WO) . |
| WO 98/27119 | 6/1998 | (WO) . |
| WO98/55518 | 12/1998 | (WO) . |

OTHER PUBLICATIONS

M.P. McDaniel, Advances in Catalysis, vol. 33, pp. 47–97., 1985.

J.C.W. Chien et al., J. Polymer Science: Part A: Polymer Chemistry, vol. 29, pp. 1603–1607., 1991.

R. Quyoum et al., J. Am. Chem. Soc., vol. 116, pp. 6435–1636, 1994.

X. Yang et al., J. Am. Chem. Soc., vol. 113, pp. 3623–3625, 1991.

* cited by examiner

Primary Examiner—Mark L. Bell
Assistant Examiner—J. Pasterczyk
(74) Attorney, Agent, or Firm—C. Paige Schmidt; Charles E. Runyan

(57) ABSTRACT

This invention relates to a catalyst system comprising a substituted, bridged bisindenyl metallocene supported on a polymeric support wherein the metallocene is activated for polymerization by an ionizing reaction and stabilized in cationic form with a noncoordinating anion. A protonated ammonium salt of a noncoordinating amine is covalently bonded to the support. Propylene polymers produced by these supported catalyst systems have melting points and polymer microstructures similar to propylene polymers produced using analogous unsupported catalyst systems.

9 Claims, No Drawings

POLYMERIC SUPPORTED CATALYSTS

This application is a continuation-in-part of U.S. Ser. No. 09/092,752, filed Jun. 5, 1998, now U.S. Pat. No. 6,100,214, which application in turn claims priority of U.S. Ser. No. 60/048,965, filed Jun. 6, 1997 and U.S. Ser. No. 60/079,569, filed Mar. 27, 1998.

TECHNICAL FIELD

This invention relates to a catalyst system comprising a substituted, bridged indenyl metallocene supported on a polymeric support wherein the metallocene is activated for polymerization by an ionizing reaction and stabilized in cationic form with a noncoordinating anion. Propylene polymers produced by these supported catalyst systems having melting points and polymer microstructures similar to propylene polymers produced using analogous unsupported catalyst systems.

BACKGROUND

The use of ionic catalysts for olefin polymerization where organometallic transition metal (i.e., metallocene) cations are stabilized in an active polymerization state by compatible, noncoordinating anions is a well-recognized field in the chemical arts. Typically such organometallic transition metal cations are the chemical derivatives of organometallic transition metal compounds having both ancillary ligands which help stabilize the compound in an active electropositive state, and labile ligands at least one of which can be abstracted to render the compound cationic and at least one of which of which is suitable for olefin insertion. Technology for supporting these ionic catalysts is also known.

U.S. Pat. No. 5,427,991 describes the chemical bonding of noncoordinating anionic activators to supports to prepare polyanionic activators that, when used with the metallocene compounds, avoid problems of catalyst desorption experienced when ionic catalysts physically adsorbed on inert supports are utilized in solution or slurry polymerization. The supports are derived from inert monomeric, oligomeric, polymeric or metal oxide support which have been modified to incorporate chemically bound, noncoordinating anions.

The preparation of polyanionic activators from hydrocarbyl compounds entails a number of reactions. A typical reaction for a polymeric core component begins with use of the lithiating agent n-BuLi, or optionally lithiating polymerizable monomers followed by polymerization of monomers into a polymeric segment to produce a polymer or cross-linked polymer having pendant hydrocarbyl lithium groups. These are subsequently treated with the bulky Lewis acid trisperfluorophenylboron (B(pfp)$_3$) and subjected to an ion exchange reaction with dimethylanilinium hydrochloride ([DMAH]$^+$[Cl]$^-$) which results in a polymer surface having covalently linked activator groups of [DMAH]$^+$[(pfp)$_3$BP]$^-$, where P is the polymeric core component.

Another method for attaching a noncoordinating anion activator to the support is described and detailed herein. An aminated polymer is prepared for example by treating a cross-linked polystyrene with a dimethyl amine. The polymer bound amine is then quarternized by ion transfer from [PhNMe$_2$H][B(C$_6$F$_5$)$_4$]. The resulting support has covalently linked activator groups of [PNMe$_2$H][B(C$_6$F$_5$)$_4$] where P is again the polymeric core component.

The functionalization of polymer resin beads for use with or preparation of heterogeneous catalytic species is also known. See, e.g., Fréchet, J. M. J., Farrall, M. J., "Functionalization of Crosslinked Polystyrene by Chemical Modification", *Chemistry and Properties of Crosslinked Polymers*, 59–83 (Academic Press, 1977); and Sun, L., Shariati, A., Hsu, J. C. , Bacon, D. W., *Studies in Surface Science and Catalysis* 1995, 89, 81, and U.S. Pat. No. 4,246,134 which describes polymeric carriers of macroporous copolymers of vinyl and divinyl monomers with specific surface areas of 30 to 70 m$^2$/g and the use of such for vinyl monomer polymerization.

In gas phase and slurry polymerization, the use of supported or heterogeneous catalysts increases process efficiencies by assuring that the forming polymeric particles achieve a shape and density that improves reactor operability and ease of handling. However, substituted, bridged indenyl type metallocenes, supported on silica or polymer supports, have long been observed to produce polypropylenes with more regio defects and subsequently shorter meso run lengths as determined by $^{13}$C NMR compared to polymers produced by the respective unsupported metallocenes in solution. These defects result in a decrease in the polymer melting point which is undesirable for many applications. This invention provides a means for minimizing or even eliminating the decreased stereospecificity normally observed when using these metallocenes in supported form. Consequently, the propylene polymers of this invention have fewer defects and higher melting points than those previously obtainable in commercial processes. This achievement represents a significant advantage for polymer producers and their customers.

SUMMARY OF THE INVENTION

This invention relates generally to polymerization catalyst compositions comprising the reaction product of a) a polymeric support functionalized with a protonated ammonium salt of a noncoordinating anion and b) one or more substituted, bridged indenyl metallocene compounds.

DESCRIPTION OF THE INVENTION

As used herein the term "isotactic propylene polymer" means a homopolymer, copolymer or terpolymer comprising at least 50% propylene units having at least 60% isotactic pentads according to analysis by $^{13}$C NMR.

As used herein the term "regio defect" means the insertion of the monomer unit in the opposite direction relative to the prevailing insertion direction. With propylene as an example, with the methylene carbon labeled as 1 and the ethylene carbon labeled as 2, the misinsertion would be that of a 2,1 insertion relative to the usual 1,2 insertion.

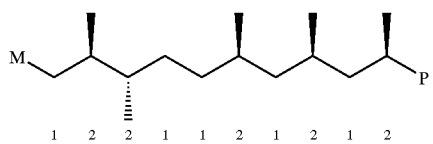

As used herein the term "stereo defect" means the insertion of the monomer unit in the opposite chiral handedness as that of previously inserted units. Two monomer units inserted with the same handedness are said to be a meso diad. Whereas, two monomer units inserted in the opposite handedness are said to be a racemic diad. A succession of meo diads constitutes an isotactic sequence. A succession of racemic diads constitutes a syndiotactic sequence.

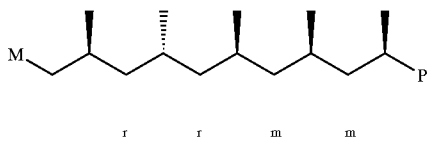

As used herein the term "mis-insertion" means insertions resulting in either regio or stereo defects.

The invention olefin polymerization catalyst composition is the product of the reaction achieved by contacting a suitable functionalization aromatic polymeric support according to formulas I or II with one or more substituted, bridged indenyl metallocenes which are described in more detail below. This product is as supported ionic catalyst composition having a substituted, bridged indenyl cation and a complementary noncoordinating anion, this composition being preferably homogeneously dispersed in the polymer support matrix. Additionally, without intending to being bound hereby, it is believed that there exists a dative interaction between the transition metal cation and the amine functionality of the polymeric support matrix. The strength of this interaction should depend on the Lewis acidity of the transition metal cation and especially the Lewis basicity of the amine functionality. This interaction would act to reduce any tendency of the ionic catalyst species to desorb from the polymer support matrix. It will be noted that extremely strong Lewis bases and/or Lewis bases with minimal steric bulk are known to strongly coordinate to the vacant coordination site at the cationic metal center (e.g., pyridine). In general, this means that secondary amines are preferred over primary amines.

The functionalized aromatic polymeric supports suitable for this invention comprise a protonated ammonium salt functionality covalently bound to a polymeric support material which is preferably an aromatic polymeric support material.

The nitrogen atom of the protonated ammonium salt functionality is substituted with one to three groups at least one of which links the ammonium functionality to the polymeric support as represented by formula I or II.

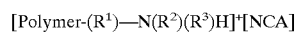

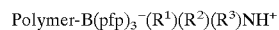

where $R^1$ and where $R^1$ in formulas I or II can be hydrocarbyl or substituted hydrocarbyl, $R^2$ and $R^3$ in formulas I or II may be the same or different and are selected from the groups consisting of: hydrogen, hydrocarbyl, and a substituted hydrocarbyl. Preferably, $R^1$, $R^2$ and $R^3$ contain 1 to 30 carbon atoms, more preferably 1 to 20. As used herein, the term "substituted hydrocarbyl" means hydrocarbyl radical wherein one or more of the hydrogen atoms of the hydrocarbyl radical $R^1$, $R^2$ and $R^3$ are replaced by a member of the groups selected from: halogens; a substantially hydrocarbyl group containing from 1 to 3 heteroatoms selected from the group consisting of N, O, S, and P; a hydrocarbyl substituted organometalloid; a halogen substituted organometalloid; and an organometalloid substituted with at least one substantially hydrocarbyl group containing from 1 to 3 heteroatoms selected from the group consisting of N, O, S, and P. NCA refers to a compatible "noncoordinating anion".

The $R^1$, $R^2$ and $R^3$ groups of the ammonium salts include those wherein two or three R groups are joined to form an alicyclic or aromatic ring having a ring nitrogen atom. For example:

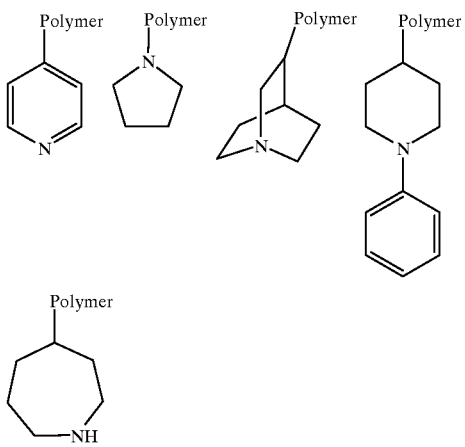

As used herein the term "noncoordinating anion" or "NCA" means an anion which, when associated with a transition metal cation, either does not coordinate to the transition metal cation or which is only weakly coordinated to said cation thereby remaining sufficiently labile to be displaced by a neutral Lewis base under polymerization conditions. "Compatible" noncoordinating anions are those which are not degraded to neutrality under polymerization conditions when the complexes between them and the transition metal cationic catalyst compounds are formed. Further, the anion will not transfer an anionic substituent or fragment to the cation so as to cause it to form a neutral four coordinates metal compound and a neutral by-product from the anion under polymerization conditions. As used herein, the term "transition metal cation" means the cation created when a ligand is abstracted from a transition metal complex.

Noncoordinating anions most useful in accordance with this invention are those which compatible, stabilize transition metal cation in the sense of balancing its ionic charge, yet retain sufficient lability to permit displacement by an olefinically unsaturated monomer during polymerization. Additionally, the anions most useful in this invention will be of sufficient molecular size to partially inhibit, or help to prevent, neutralization of the transition metal cation by Lewis bases other than the polymerizable monomers that may be present in the polymerization process. Suitable noncoordinating anions are described in, for example, U.S. Pat. Nos. 5,198,401, 5,278,119, 5,407,884, 5,599,761, (each fully incorporated herein by reference) preferably they will be labile proton-containing, nitrogen-based salts described in these documents.

Particularly preferred NCAs are those represented by the formula:

wherein:
B is boron in a valence state of 3;
$Ar_1$ and $Ar_2$ are the same or different substituted-aromatic hydrocarbon radicals which radical may be linked to each other through a stable bridging group;
and $X_3$ and $X_4$ are independently selected from the group consisting of hydride radicals, halide radicals, hydrocarbyl radicals, substituted-hydrocarbyl radicals and organometalloid radicals.

Preferably, at least one of $Ar_1$ and $Ar_2$ are substituted with a fluoro radical, more preferably perfluorophenyl radicals. Preferably, $X_3$ is also a perfluorophenyl radical and $X_4$ is either a perfluorophenyl radical or a straight or branched alkyl radical.

The polymeric support comprises polymeric compound which may be any hydrocarbon based polymeric compound. Preferably the support is an aromatic hydrocarbon polymeric compound which has a surface area in the range of from about 1–400 $m^2/g$, more preferably less than about 20 $m^2/g$ and most preferably 10 $m^2/g$ of less so as to avoid excessive monomer access to the active catalyst sites, which sites are essentially uniformly distributed throughout the mass of the support by virtue of the randomly incorporated functional groups on the polymeric chains making up the support.

Porosity is measured as a single point nitrogen B.E.T. (Brunauer, S., Ehmmet, P. H., Teller, E., *JACS* 1938, 60, 309) and can be exemplified by the use of polystyrene based beads or gels. These beads or gels are lightly cross-linked and randomly functionalized with the ammonium salt compounds. Thus the support should be insoluble under normal polymerization operating conditions. Preferably the support is in the form of spheres of uniform dimension having a normal size range between 100 and 400 US Mesh sizing (30 to 100 micrometers).

Suitable functionalized, aromatic polymeric supports can be obtained commercially, e.g., polystyrene beads or gels, or prepared synthetically in accordance with general knowledge in the art. The preferred support of this invention are crosslinked polystyrene beads and gels produced by emulsion polymerization techniques. Examples of commercial products are the Advanced Polymer Systems Microsponge® and the Johns-Manville Chromosorb®. Functionalized hydrocarbon polymers such as but not limited to halogenated or aminated polypropylene or polyethylene produced from metal oxide supported or metal halide supported transition metal catalysts are also possible supports.

Support synthesis generally consists of the copolymerization of vinyl monomers with comonomers having functionalization suitable for nucleophilic substitution by ammonium salts either by direct copolymerization or by copolymerization and subsequent chemical reaction that places the appropriate functional groups according to Formulas I or II on the hydrocarbon polymer chains making up the supports. A specific example is polystyrene-divinylbenzene copolymer gel or beads. The relative strength, i.e., resistance to fracture, is provided by the content of divinylbenzene (DVB) comonomer (weight %), commercially available products contain from 2 to 20 wt. % DVB. The higher ranges of DVB, e.g., 10 to 20 wt. %, provide additional strength but the resulting additional crosslinking may hinder kinetics by making the bead resistant to the shrinking and swelling necessary for normal polymerization operations. The effective porosity is adjustable by selection of divinylbenzene content. For example, DVB contents of 5 to 10 wt % can yield restricted polymerization kinetics suitable for high activity polymerization catalysis, DVB contents of 1 to 5 wt. % can provide less restricted polymerization kinetics suitable for lower activity polymerization catalysis. The term "high activity" relates to catalyst systems capable of activities greater than about $1 \times 10^7$ g-polymer/mol.-transition metal compound-atm-hr and "low activity" can be understood as below about that amount.

Compound I can be prepared from the corresponding neutral amine defined in formula III:

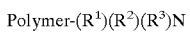

Polymer-$(R^1)(R^2)(R^3)$N                                 III (all of $R^1$, $R^2$ and $R^3$ defined above) by either protonation by a molar excess of an acid $H^+X^-$ followed by ion exchange with a salt of a compatible noncoordinating anion $M'^+NCA^-$. In the most general terms $M'^+$ can be any cationic species and $X^-$ any anionic species. It will be obvious to one skilled in the art that $H^+X^-$ should be chosen so as to have a lower $pK_a$ value than the conjugate acid of II. Additionally $M'^+$ and $X^-$ should be chosen so that the byproduct of the ion exchange reaction, $M'^+X^-$, is either soluble in the reaction solvent chosen or a compatible wash solvent. Representative non-limiting examples of suitable $X^-$ groups include halide, chlorate, perchlorate, triflate, perhaloborate, perhaloantimonate. Representative non-limiting examples of suitable $M'^+$ groups include alkali metal cations and ammonium cations. Finally it should be noted that the protonation of amines to yield ammonium salts is a technique well known in the art, simplifying the selection of $H^+X^-$. Preferably the product of I can be prepared in a single reaction by reacting the product of II with the ammonium salt of a compatible noncoordinating anion, $R^4R^5R^6NH^+NCA^-$. $R^4$, $R^5$, and $R^6$ are chosen from the same group of radicals as $R^1$, $R^2$ and $R^3$ above, with the additional criterion that they should be chosen so as to yield an ammonium salt with a lower $pK_a$ value than that of the product of I above. Methods to calculate $pK_a$ are well known in the art, and experimentally measured $pK_a$ are known for a variety of amines. This provides knowledge of general guiding principles on the part of those skilled in the art (e.g., aryl substituents lower $pK_a$ relative to alkyl substituents). See, for example, Perrin, D. D., Dempsey, S., Serjeant, E. P., *$pK_a$ Predictions for Organic Acids and Bases* (Chapman and Hall, London, 1981). Suitable solvents include aliphatic and aromatic hydrocarbons, ethers (including cyclic ethers) and halocarbons (both aliphatic and aromatic hydrocarbons).

The compound of II can be prepared from the direct copolymerization of the functionalized monomer with the monomeric precursors of the polymeric support. Specifically para-dimethylaminostyrene can be co-polymerized with styrene and divinylbenzene to yield the amine functionalized precursor of the invention catalyst. Preferably II can be prepared from a functionalized polymeric precursor III:

Polymer-Y                                              III wherein Y is a functional group known to be readily convertible to the amine functionality $R^1R^2R^3N$— described above. Methods for converting a wide variety of functional groups to the amine functionality are well known in the art, suitable functional groups include but are not limited to: Alkanes, alkenes, alkyl halides, aryl halides, azides, nitro compuonds, alcohols, aldehydes and ketones, nitriles, and organometalloids (for a general discussion see T. C. Larock, "Comprehensive Organic Transformations: a guide to functional group preparations", pgs. 385–438, (VCH publishers, 1989)).

Since there are many reactions of the types described above (synthesis of amines, protonation of amines, ion exchange) known in the art, reactions which proceed with high selectivity and with essentially quantitative yields, the polymeric supported activators can be readily produced in essentially pure form, i.e., as single molecular structures without any significant amount of reaction by-products. Infrared spectroscopy provides a useful analytical method for monitoring the extent of the reaction to optimize reaction conditions, further assuring a high purity product. Specifically, commercially available choromethylated polystyrene-co-divinylbenzene beads can be treated with a variety of dihydrocarbyl secondary amines to form weakly basic anion exchange resin, corresponding to precursor II, Reaction of these materials with dimethylanilinium tetrakis (perfluorophenyl) borate yields a compound of type I, the protonated ammonium salt functionalized polymeric support.

The reaction between the support and the metallocene should be conducted to facilitate permeation of the metallocene into the matrix of the polymeric support. Preferably, therefore, supported activator particles are treated with a solution of the metallocene. Suitable solvents for the metallocene may be aliphatic or aromatic, depending upon the ligation, the chemical composition of the support material, and the degree of crosslinking of the support. Toluene and hexane are typical. It is particularly desirable to use a solvent to swell the support when it has a surface area at or below about 50 m²/g. The reaction temperature and pressure can vary so long as the reactants, solvents and the carrier are neither degraded nor rendered unreactive. Ambient conditions are suitable. The resulting activation by protonation and stabilization with the noncoordinating anions is well known.

A mixture of two or more metallocenes may be used to tailor polymer composition distribution. One solution containing all of the metallocenes should be made and all of the metallocenes should be completely dissolved. Sequential additional of metallocenes or insufficient dissolution of one or more of the metallocenes may result in a inhomogeneous distribution of active centers within the catalyst granule.

The "substituted, bridged indenyl" are defined to mean metallocenes, i.e., transition metal compounds, which are consistent with the formula:

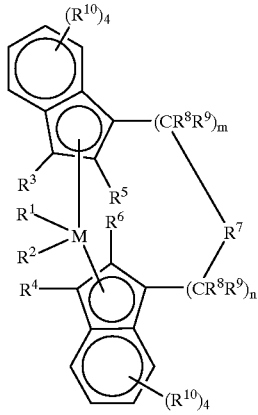

wherein M is a metal of Group 4, 5, or 6 of the Periodic Table preferably zirconium, hafnium and titanium, most preferably zirconium;

$R^1$ and $R^2$ are identical or different, preferably identical, and are one of a hydrogen atom, a $C_1$–$C_{10}$ alkyl group, preferably a $C_1$–$C_3$ alkyl group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ group, preferably a $C_2$–$C_4$ alkenyl group, a $C_7$–$C_{10}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group.

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

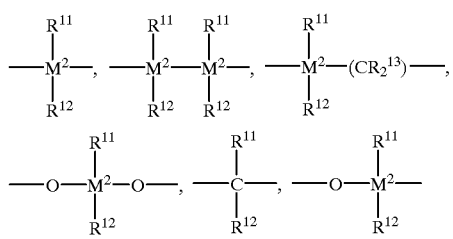

—$B(R^{11})$—; —$Al(R^{11})$—, —$Ge$—, —$Sn$—, —$O$—, —$S$—, —$SO$—, —$SO_2$—, —$N(R^{11})$—, —$CO$—, —$P(R^{11})$—, or —$P(O)(R^{11})$—;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{20}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroalkyl group, a $C_1$–$C_{20}$ alkoxy group, preferably a $C_1$–$C_{10}$ alkoxy group, a $C_2$–$C_{20}$ alkenyl group, preferably a $C_2$–$C_{20}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^3$, $R^4$, and $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) refers to fluorine, chlorine, bromine or iodine atoms, preferably fluorine or chlorine.

Particularly preferred substituted, bridged indeny compounds of the structures (A) and (B):

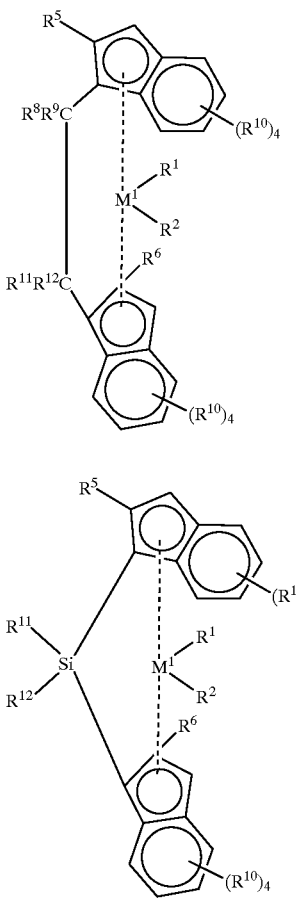

wherein:

M¹ is Zr or Hf, R¹ and R² are methyl or chlorine, and R⁵, R⁶R⁸, R⁹, R¹⁰, R¹¹ and R¹² have the above-mentioned meanings.

These chiral metallocenes may be used as a racemate for the preparation of highly isotactic polypropylene copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Illustrative but non-limiting examples of preferred substituted, bridged indenyls include:

Dimethylsilandiylbis(2-methyl-4-phenyl-1-indenyl)Zr(CH$_3$)$_2$
Dimethylsilandiylbis(2-methyl-4,5-benzoindenyl)Zr(CH$_3$)$_2$;
Dimethylsilandiylbis(2-methyl-4,6-diisopropylindenyl)Zr(CH$_3$)$_2$;
Dimethylsilandiylbis(2-ethyl-4-phenyl-1-indenyl)Zr(CH$_3$)$_2$;
Dimethylsilandiylbis(2-ethyl-4-naphthyl-1-indenyl)Zr(CH$_3$)$_2$,
Phenyl(methyl)silandiylbis(2-methyl-4-phenyl-1-indenyl)Zr(CH$_3$)$_2$,
Dimethylsilandiylbis(2-methyl-4-(1-naphthyl)-1-indenyl)Zr(CH$_3$)$_2$,
Dimethylsilandiylbis(2-methyl-4-(2-naphthyl)-1-indenyl)Zr(CH$_3$)$_2$,
Dimethylsilandiylbis(2-methyl-indenyl)Zr(CH$_3$)$_2$,
Dimethylsilandiylbis(2-methyl-4,5-diisopropyl-1-indenyl)Zr(CH$_3$)$_2$,
Dimethylsilandiylbis(2,4,6-trimethyl-1-indenyl)Zr(CH$_3$)$_2$,
Phenyl(methyl)silandiylbis(2-methyl-4,6-diisopropyl-1-indenyl)Zr(CH$_3$)$_2$,
1,2-Ethandiylbis(2-methyl-4,6-diisopropyl-1-indenyl)Zr(CH$_3$)$_2$,
1,2-Butandiylbis(2-methyl-4,6-diisopropyl-1-indenyl)Zr(CH$_3$)$_2$,
Dimethylsilandiylbis(2-methyl-4-ethyl-1-indenyl)Zr(CH$_3$)$_2$,
Dimethylsilandiylbis(2-methyl-4-isopropyl-1-indenyl)Zr(CH$_3$)$_2$,
Dimethylsilandiylbis(2-methyl-4-t-butyl-1-indenyl)Zr(CH$_3$)$_2$,
Phenyl(methyl)silandiylbis(2-methyl-4-isopropyl-1-indenyl)Zr(CH$_3$)$_2$,
Dimethylsilandiylbis(2-ethyl-4-methyl-1-indenyl)Zr(CH$_3$)$_2$,
Dimethylsilandiylbis(2,4-dimethyl-1-indenyl)Zr(CH$_3$)$_2$,
Dimethylsilandiylbis(2-methyl-4-ethyl-1-indenyl)Zr(CH$_3$)$_2$,
Dimethylsilandiylbis(2-methyl-α-acenaphthyl-1-indenyl)Zr(CH$_3$)$_2$,
Phenyl(methyl)silandiylbis(2-methyl-4,5-benzo-1-indenyl)Zr(CH$_3$)$_2$,
Phenyl(methyl)silandiylbis(2-methyl-4,5-(methylbenzo)-1-indenyl)Zr(CH$_3$)$_2$,
Phenyl(methyl)silandiylbis(2-methyl-4,5-(tetramethylbenzo)-1-indenyl)Zr(CH$_3$)$_2$,
Phenyl(methyl)silandiylbis(2-methyl-α-acenaphthyl-1-indenyl)Zr(CH$_3$)$_2$,
1,2-Ethandiylbis(2-methyl-4,5-benzo-1-indenyl)Zr(CH$_3$)$_2$,
1,2-Butandiylbis(2-methyl-4,5-benzo-1-indenyl)Zr(CH$_3$)$_2$,
Dimethylsilandiylbis(2-methyl-4,5-benzo-1-indenyl)Zr(CH$_3$)$_2$,
1,2-Ethandiylbis(2,4,7-trimethyl-1-indenyl)Zr(CH$_3$)$_2$,
Dimethylsilandiylbis(2-methyl-1-indenyl)Zr(CH$_3$)$_2$,
1,2-Ethandiylbis(2-methyl-1-indenyl)Zr(CH$_3$)$_2$,
Phenyl(methyl)silandiylbis(2-methyl-1-indenyl)Zr(CH$_3$)$_2$,
Diphenylsilandiylbis(2-methyl-1-indenyl)Zr(CH$_3$)$_2$,
1,2-Butandiylbis(2-methyl-1-indenyl)Zr(CH$_3$)$_2$,
Dimethylsilandiylbis(2-ethyl-1-indenyl)Zr(CH$_3$)$_2$,
Dimethylsilandiylbis(2-methyl-5-isobutyl-1-indenyl)Zr(CH$_3$)$_2$,
Phenyl(methyl)silandiylbis(2-methyl-5-isobutyl-1-indenyl)Zr(CH$_3$)$_2$,
Dimethylsilandiylbis(2-methyl-5-t-butyl-1-indenyl)Zr(CH$_3$)$_2$,
Dimethylsilandiylbis(2,5,6-trimethyl-1-indenyl)Zr(CH$_3$)$_2$,
and the like.

These and other preferred substituted, bridged indenyl compounds are described in detail in U.S. Pat. Nos. 5,145,819; 5,243,001; 5,239,022; 5,329,033; 5,296,434; 5,276,208; 5,672,668; 5,304,614 and 5,374,752; and EP 549 900 and 576 970 all of which are herein fully incorporated by reference.

Additionally, metallocenes such as those described in U.S. Pat. No. 5,510,502, U.S. Pat. No. 4,931,417, U.S. Pat. No. 5,532,396, U.S. Pat. No. 5,543,373, WO 98/014585, EP611 773 and WO 98/22486 (each fully incorporated herein by reference) are suitable for use in this invention.

Generally, the polymeric support should contains from about 0.01 to 0.7 meq. substituted, bridged indenyl compound per gram polymer, more preferably 0.01 to 0.3 meq. The polymeric supported cocatalyst activator should contain 0.01 to 0.9 meq. metal atom per gram of polymer, preferably from about 0.02 to about 0.3 meq. metal patom per gram of polymer.

When using the supported ionic catalysts of the invention, the total catalyst system can additionally comprise one or more scavenging compounds. The term "scavenging compound" means those compounds effective for removing impurities from the reaction environment. Impurities can be inadvertently introduced with any of the polymerization reaction components, particularly with solvent, monomer and catalyst feed. Impurities can result in decreased, variable or even elimination of catalytic activity. Typical impurities include water, oxygen, metal impurities, etc.

Typically the scavenging compound will be an organometallic compound such as the Group 13 organometallic compounds of U.S. Pat. Nos. 5,153,157, 5,241,025 and WO-A-93/14132, WO-A-94/07927, and that of WO-A-95/07941. Exemplary compounds include triethyl aluminum, triethyl borane, triisobutyl aluminum, methylalumoxane, isobutyl aluminoxane, and tri(n-octyl)aluminum. Those scavenging compounds having bulky or $C_8$–$C_{20}$ liner hydrocarbyl substituents covalently bound to the metal or metalloid center being preferred to minimize adverse interaction with the active catalyst. The amount of scavenging agent to be used with supported transition-metal cation-noncoordinating anion pairs is minimized during polymerization reactions to that amount effective to enhance activity.

The catalyst compositions of this invention may be used in a wide variety of polymerization processes to prepare a wide variety of polymers, but these catalyst compositions particularly suitable for propylene polymerization. Any process may be used but propylene polymerization are most commonly conducted using a slurry processes in which the polymerization medium can be either a liquid monomer, like propylene, or a hydrocarbon solvent or diluent, propane, isobutane, hexane, heptane, cyclohexane, etc. or an aromatic diluent such as toluene. The polymerization temperatures may be those considered low, e.g., less than 50° C., preferably 0° C.–30° C., or may be in a higher range, such as up to about 150° C., preferably from 50° C. up to about 80° C., or at any ranges between the end points indicated. Pressures can vary from about 100 to about 700 psia (0.76–4.8 MPa. Additional description is given in U.S. Pat. Nos. 5,274,056 and 4,182,810 and WO 94/21962 which are fully incorporated by reference.

Propylene homopolymers may be formed with this system using conventional batch slurry techniques. The microstructure of the homopolymer will preferably possess a meso run length as measured by 13C NMR 65% or greater relative to that produced with the unsupported metallocene catalyst. Copolymers with ethylene may be formed by introduction of ethylene to the propylene slurry or gas phase polymerization of gaseous propylene and ethylene comonomers. Copolymers with ethylene preferably contain 0 to 10 wt % comonomer. Stereoregular homopolymers and copolymers of α-olefins may be formed with this system by introduction of the appropriate monomer or monomers to a slurry or bulk propylene process.

EXAMPLES

Unfunctionalized polystyrene-co-divinylbenzene beads (1% DVB, 200–400 mesh) were supplied by Biorad Laboratories (Hercules, Calif.) and washed carefully prior to use. Chloromethylated beads were acquired from Biorad (4.0 meq Cl/g 200–400 mesh; and 1.35 meq Cl/g, 200–400 mesh) and Acros Organics (Pittsburg, Pa.) (0.4 meq Cl/g, 100–200 mesh) and either used as received or subjected to a modification of the above washing procedure in which the initial heated washing stages were replaced by ½ h in aq. $K_2CO_3$ to avoid hydrolysis. $CH_2Cl_2$ was degassed by bubbling argon for ½ h prior to use. Other solvents and reagents were used as received. Low functionalization choromethylated beads (0.15 meq Cl/g) were prepared by the method of J. T. Sparrow, *Tet. Lett.*, 1975, 53, 4367. Slurry polymerizations were conducted in 1.25 L of bulk propylene with triethylaluminum in a 2 L autoclave. Abbreviations in these examples include the following: THF (tetrahydrofuran), Ph (phenyl), Me (methyl), Bn (benzyl).

Differential scanning calorimetry (DSC) data was collected using a Perkin Elmer DSC-7. Approximately 6.0 mg of polypropylene granules was massed into a sample pan and the following thermal program was used. The polymer was annealed for 5 minutes at 200° C. It was subsequently cooled to 25° C. at a rate of 10° C./min. The temperature was held for 5 minutes at 25° C. The sample was then heated to 200° C. at a rate of 10° C./min. The peak melting temperature was recorded.

$^{13}C$ NMR data was obtained at 100 MHz at 125° C. on a Varian VXR 400 NMR spectrometer. A 90° C. pulse, an acquisition time of 3.0 seconds, and a pulse delay of 20 seconds was employed. The spectra were broad band decoupled and were acquired without gated decoupling. Similar relaxation times and nuclear Overhauser effects are expected for the methyl resonances of polypropylenes, which were the only homopolymer resonances used for quantitative purposes. A typical number of transients collected was 2500. The sample was dissolved in tetrachlorethane-d2 at a concentration of 15% by weight. All spectral frequencies were recorded with respect to an internal tetramethylsilane standard. In the case of the polypropylene homopolymer, the methyl resonances were recorded with respect to 21.81 ppm for mmmm, which is close to the reported literature value of 21.855 ppm for an internal tetramethylsilane standard. The pentad assignments used are well established.

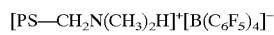

Chloromethylated polystyrene-co-divinylbenzene beads with loadings of 0.14–4.0 Cl/g were swollen in a solution of dimethylamine in THF (2M, Aldrich), and stirred for two days at room temperature. They were then rinsed with THF, THF/water 2:1, THF/water 1:2, water (twice), THF/water 1:2, THF/water 2:1, THF (twice) and dried under vacuum at 60° C. overnight. The aminated beads were treated with a 0.07 M solution of [PhNMe$_2$H][B(C$_6$F$_5$)$_4$] in CH$_2$Cl$_2$ (1.5 equivalents) for 1.5 hr, and then filtered and rinsed with CH$_2$Cl$_2$ (4 times) to yield beads with boron loadings of 0.15–1.1 meq. boron/g. Boron loadings were evacuated gravimetrically and by an IR assay. These beads were then treated with a variety of Group 4 metallocenes to generate the active catalytic species at loadings of 0.14–0.7 meq. catalyst/gram of beads. The metallocene loadings were approximated on the basis of quantitative reaction of metallocene with borated bead. Borated beads were typically treated with 3 equivalents of metallocene compound.

Chloromethylated polystyrene-co-divinylbenzene beads with loadings of 0.4–4.0 meq. Cl/g were swollen in neat N-methylaniline and stirred for two days at room temperature. They were then rinsed with THF, THF/water 2:1, THF/water 1:2, water (twice), THF/water 1:2, THF/water 2:1, THF (twice) and dried under vacuum at 60° C. overnight. The aminated beads were treated with a 0.07 M solution of $[Ph_2NH_2][B(C_6F_5)_4]$ in $CH_2Cl_2$ (1.5 equivalents) for 1.5 h, and then filtered and rinsed with $CH_2Cl_2$ (4 times) to yield beads with boron loadings of 0.36–0.87 meq. boron/g. Boron loadings were evaluated gravimetrically after careful drying.

Example 1—Catalyst A Preparation

In an inert atmosphere glove box, 1.0 gram of the protonated ammonium salt activator $[PS—CH_2N(CH_3)_2H]^+[B(C_6F_5)_4]^-$ with 0.67 mmol available functional group per gram of beads (i.e., 0.67 meq) prepared as discussed above was slurried in 20 mL of dry, oxygen free toluene at 25° C. under nitrogen in a 100 mL round bottom flask while stirring with a magnetic stirrer, followed by the addition of 0.076 g of dimethylsilyl bis(2-methyl-4-phenylindenyl)zirconium dimethyl in small portions. The reaction was stirred for 1 hour. 30 ml of pentane was added and the mixture was stirred for several minutes. The solvent was decanted and 40 ml of fresh pentane was added. After several minutes of stirring, the solvent was decanted. The solid was vacuum dried overnight yielding 0.802 g of finished catalyst. Final catalyst loading was calculated to be 0.13 mmol of transition metal per gram of finished catalyst.

Example 2—Catalyst B Preparation

Catalyst B was prepared in analogous manner to Catalyst A, but 0.871 grams of protonated ammonium salt activator $[PS—CH_2N(CH_3)_2H^+[B(C_6F_5)_4]^-$ with 0.67 mmol available functional group per gram of beads (i.e., 0.67 meq) was reacted with 0.076 g of dimethylsilyl bis(2-methyl-4-(1-naphthyl)indenyl)zirconium dimethyl yielding 0.706 g of finished catalyst (some material loss due to transfer), with a calculated loading of 0.13 mmol of transition metal per gram of finished catalyst.

Comparative Example 3—Catalyst C Preparation

In a nitrogen purged glove box, 0.18 g Dimethylsilylbis (2-methyl-4-phenyl indenyl)zirconium was placed in a 100 ml beaker with a mini stir bar. 9.3 g of a 30 % wt % solution of methylaluminoxane was added to the beaker. The mixture was stirred for one hour producing a red solution. The solution was added slowly to 10.0 g of Davison 952 silica (calcined at 600° C.) with mechanical mixing. After the addition was complete the solid was vacuum dried. Yield: 12.47 g. Final catalyst loading was calculated to be 0.022 mmol of transition metal per gram of finished catalyst.

Comparative Example 4—Catalyst D Preparation

In a nitrogen purged glove box, 180.5 g of Davison 952 silica (calcined at 600° C.) was massed and placed in a 4 L 3 neck flask equipped with an overhead stirrer. 1.5 L of dry toluene was added and the mixture was slurried. 13.0 ml of N,N-diethyl aniline was added to the mixture. After 5 minutes of stirring, 39.5 g of tris(pentafluorophenyl)boron was added. The mixture was stirred for one hour. 17.5 g of Dimethylsilylbis(2-methyl-4-phenyl indenyl)zirconium was added to the mixture and it was stirred for 2 hours. After this time the stirring was stopped and the solvent was decanted. The solid was vacuum dried. Yield: 210 g. Final catalyst loading was found to be 0.127 mmol of transition metal per gram of finished catalyst.

Comparative Example 5—Catalyst E Preparation

In a nitrogen purged glove box, 1.97 g of Davison 952 silica (calcined at 600° C.) was massed and placed in a 50 ml round bottom flask containing a stir bar. 20 ml of toluene was added and the silica was slurried. 0.14 ml of N,N-diethyl aniline was added to the mixture. After 5 minutes of stirring, 0.429 g of tris(pentafluorophenyl)boron was added. The mixture was stirred for 1 hour. 0.15 g of Dimethylsilylbis(2-methyl-4-(1-naphthyl)indenyl) zirconium dimethyl was added and the mixture was stirred for two hours. After this time, the solvent was removed invacuo. Yield: 2.55 g. Final catalyst loading was found to be 0.078 mmol of transition metal per gram of finished catalyst.

Polymerization Example 1

A 2 L autoclave reactor was heat dried under nitrogen flow for 45 minutes. 0.4 ml of a 1M solution of triethylaluminum solution in hexane was introduced as a scavenger. 36 mmol of $H_2$ was added followed by 1050 ml of propylene. The reactor temperature was raised to 70° C. 0.0413 g of catalyst A was flushed into the reactor with 200 ml of propylene. The polymerization mixture was stirred for 1 hour at 500 ppm. The polymerization was stopped by cooling the reactor and venting the propylene. Yield: 242 g. Catalyst Efficiency: 5860 g PP/g catalyst, Melt Flow Rate: 23 dg/min. Tm: 155.1° C., MWD 3.87.

Polymerization Example 2

The reactor was prepared as in Example 1 except 0.6 ml of a 1M solution of triethylaluminum solution and 25 mmol of $H_2$ were used. 0.041 g of Catalyst B was flushed into the reactor with propylene to initiate the polymerization. The polymerization mixture was stirred for 1 hour. Yield: 329 g, Catalyst Efficiency: 8020 g PP/g Catalyst, Melt Flow Rate: 4.8 dg/min, Tm: 156.4° C., MWD 3.34.

Comparative Polymerization Example 3

The reactor was prepared as in Example 1 except 0.25 ml of a 1M solution of triethylaluminum solution and 25 mmol of $H_2$ were used. 0.101 g of Catalyst C was flushed into the reactor with propylene to initiate the polymerization. The polymerization mixture was stirred for 1 hour. Yield: 272 g, Catalyst Efficiency: 2690 g PP/g Catalyst, Melt Flow Rate: 1.6 dg/min, Tm: 152.8° C., MWD 4.27.

Comparative Polymerization Example 4

The reactor was prepared as in Example 1 except 0.25 ml of a 1M solution of triethylaluminum solution and 25 mmol of $H_2$ were used. 0.037 g of Catalyst D was flushed into the reactor with propylene to initiate the polymerization. The polymerization mixture was stirred for 1 hour. Yield: 265 g, Catalyst Efficiency: 7160 g PP/g Catalyst, Melt Flow Rate: 0.44 dg/min, Tm: 152.2° C., MWD 2.44.

Comparative Polymerization Example 5

The reactor was prepared as in example 1 except 0.25 ml of a 1M solution of triethylaluminum solution and 25 mmol of $H_2$ were used. 0.041 g of Catalyst E was flushed into the reactor with propylene to initiate the polymerization. The polymerization mixture was stirred for 1 hour. Yield: 289 g, Catalyst Efficiency: 7050 g PP/g Catalyst, Melt Flow Rate: 3.5 dg/min, Tm: 152.2° C., MWD 6.90.

Comparative Polymerization Example 6

The reactor was prepared as in Example 1 except 500 ml of dry hexane was added as a solvent. 0.25 ml of a 1M solution of triethylaluminum solution, 149 mmol of $H_2$ and 500 ml of propylene were subsequently added. The reactor temperature was increased to 70° C. 0.023 g of Dimethylsilylbis(2-methyl-4-phenyl indenyl)zirconium and 0.033 g of N,N-dimethyl anilinium tetrakis(pentafluoro) borate were dissolved in 20 ml of toluene. 2 ml of this solution was flushed into the reactor with 250 ml of propylene. The polymerization mixture was stirred for 15 minutes. The reaction was stopped by cooling the reactor and venting the propylene. The hexane solvent was evaporated and the polymer was dryed. Yield: 17.0 g, Catalyst Efficiency: $4.3 \times 10^6$ g PP/mmol Zr, Tm: 155, Mwe: 37000, MWD: 1.74.

Polymerization Example 7

The reactor was prepared as in Example 1 except 0.4 ml of a 1M solution of triethylaluminum solution and 25 mmol of $H_2$ were used. 0.041 g of catalyst A was flushed into the reactor with propylene to initiate the polymerization. The polymerization mixture was stirred for 15 minutes. Yield: 28.8 g, Catalyst Efficiency: 699 gPP/g catalyst, Tm 155.6, Mw 86000, MWD: 3.88.

Comparative Polymerization Example 8

The reactor was prepared as in Example 1 except 0.4 ml of a 1M solution of triethylaluminum solution and 55 mmol of $H_2$ were used. 0.102 g of Catalyst C was flushed into the reactor with propylene to initiate the polymerization. The polymerization mixture was stirred for 1 hour. Yield: 230 g, Catalyst Efficiency: 2300 gPP/g catalyst, Tm 151.1, Mw 189000, MWD: 7.08.

Comparative Polymerization Example 9

Catalyst D was fed into the continuous pilot reactor at 70° C. with a hydrogen setpoint of 5000 mppm. Catalyst Efficiency: 8600 gPP/gcat·hr., Tm 152.3, MWD: 2.70. Molecular weight was 105,000.

TABLE 2

Amount of Defects from $^{13}C$ NMR

| Polymerization | Support | Metallocene | Activator | Stereo Defects/ 10K | Regio defects/ 10K | Meso Run Length |
|---|---|---|---|---|---|---|
| 6 | none | 2-methyl 4-phenyl | DMAH | 34.4 | 20.8 | 181 |
| 7 | polystyrene | 2-methyl 4-phenyl | bound anilinium | 27.3 | 45.4 | 137.6 |
| 8 | silica | 2-methyl 4-phenyl | MAO | 19.9 | 80.0 | 100 |
| 9 | silica | 2-methyl 4-phenyl | bound anilinium | 19.2 | 75.4 | 106 |

While the present invention has been described and illustrated by reference to particular embodiments, it will be appreciated by those of ordinary skill in the art that the invention leads itself to many different variations not illustrated herein. For these reasons, then, reference should be made solely to the appended claims for purposes of determining the true scope of the present invention.

What is claimed is:

1. An catalyst composition comprising the reaction product of a) a polymeric support functionalized with a covalently bonded protonated ammonium salt of a noncoordinating anion and b) one or more bridged, substituted indenyl metallocene compounds.

2. The catalyst composition of claim 1 wherein the support is an aromatic polymeric support.

3. The catalyst composition of claim 1 wherein the support is polystyrene.

4. The catalyst composition of claim 1 wherein the metallocene is represented by the formula:

TABLE 1

70° C. Propylene Polymerization Results

| Poly. No. | Support | Metallocene | Activator | Hydrogen (mmol) | Efficiency (gPP/gCat) | Tm (° C.) | Mw | MWD |
|---|---|---|---|---|---|---|---|---|
| 1 | Polystyrene | 2-methyl-4-phenyl[2] | Bound anilinium | 25 | 5900 | 155.1 | 46 K | 3.8 |
| 2 | Polystyrene | 2-methyl 4-nephthyl[3] | bound anilinium | 25 | 8000 | 156.97 | NA | NA |
| 3 (comp.) | Silica | 2-methyl 4-phenyl $Cl_2$[4] | MAO | 25 | 2700 | 152.8 | 320 K | 4.27 |
| 4 (comp.) | Silica | 2-methyl 4-phenyl | Bound anilinium | 25 | 7100 | 152.2 | 460 K | 2.44 |
| 5 (comp.) | Silica | 2-methyl 4-naphtyyl | bound anilinium | 25 | 7100 | 152.2 | 298 K | 6.90 |
| 6 (comp.) | None | 2-methyl 4-naphthyl | DMAH[5] | 149 | $4.3 \times 10^1$ | 155 | 37 K | 1.74 |
| 7 | Polystyrene | 2-methyl 4-phenyl | bound anilinium | 25 | 699 | 155.6 | 86 K | 3.88 |
| 8 (comp.) | Silica | 2-methyl 4-phenyl $Cl_2$ | MAO | 55 | 2300 | 151.1 | 189 K | 7.08 |
| 9 (comp.) | Silica | 2-methyl 4-phenyl | bound anilinium | 5000 (mppm) | 8600 | 152.3 | 105 K | 2.70 |

[1] gPP/mmol Zr
[2] dimethylsilylbis(2 methyl-4-phenylindenyl)zirconium dimethyl
[3] dimethylsilylbis(2 methyl-4-naphthylindenyl)zirconium dimethyl
[4] dimethylsilylbis(2 methyl-4-phenylindenyl)zirconium dichloride
[5] N,N-dimethyl anilinium tetrakis(perfluorophenyl)boron

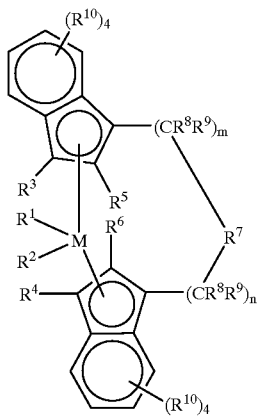

wherein M is a metal of Group 4, 5, or 6 of the Periodic Table;

$R^1$ and $R^2$ are identical or different, preferably identical, and are one of a hydrogen atom, a $C_1$–$C_{10}$ alkyl group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, or a $C_8$–$C_{40}$ arylalkenyl group;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

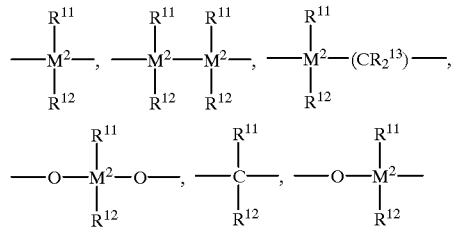

—$B(R^{11})$—; $^-Al(R^{11})$—, —Ge—, —Sn—, —O—, —S—, —SO—, —$SO_2$—, —$N(R^{11})$—, —CO—, —$P(R^{11})$—, or —$P(O)(R^{11})$—;

wherein:
$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroalkyl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, form one or more ring systems;

$M^2$ is silicon, germanium or tin;
$R^8$ and $R^9$ are identical or different and have the meanings stated for $R^{11}$;
m and n are identical or different and are zero, 1 or 2, m plus n being zero, 1 or 2; and
the radicals $R^3$, $R^4$, and $R^{10}$ are identical or different and have the meanings stated for $R^{11}$, $R^{12}$ and $R^{13}$ or two adjacent $R^{10}$ radicals are joined together to form a ring system.

5. The catalyst composition of claim 1 wherein the metallocene is selected from the group consisting of:

Dimethylsilandiylbis(2-methyl-4-phenyl-1-indenyl)Zr(CH$_3$)$_2$

Dimethylsilandiylbis(2-methyl-4,5-benzoindenyl)Zr(CH$_3$)$_2$;

Dimethylsilandiylbis(2-methyl-4,6-diisopropylindenyl)Zr(CH$_3$)$_2$;

Dimethylsilandiylbis(2-ethyl-4-phenyl-1-indenyl)Zr(CH$_3$)$_2$;

Dimethylsilandiylbis(2-ethyl-4-naphthyl-1-indenyl)Zr(CH$_3$)$_2$,

Phenyl(methyl)silandiylbis(2-methyl-4-phenyl-1-indenyl)Zr(CH$_3$)$_2$,

Dimethylsilandiylbis(2-methyl-4-(1-naphthyl)-1-indenyl)Zr(CH$_3$)$_2$,

Dimethylsilandiylbis(2-methyl-4-(2-naphthyl)-1-indenyl)Zr(CH$_3$)$_2$,

Dimethylsilandiylbis(2-methyl-indenyl)Zr(CH$_3$)$_2$,

Dimethylsilandiylbis(2-methyl-4,5-diisopropyl-1-indenyl)Zr(CH$_3$)$_2$,

Dimethylsilandiylbis(2,4,6-trimethyl-1-indenyl)Zr(CH$_3$)$_2$,

Phenyl(methyl)silandiylbis(2-methyl-4,6-diisopropyl-1-indenyl)Zr(CH$_3$)$_2$, 1,2-Ethandiylbis(2-methyl-4,6-diisopropyl-1-indenyl)Zr(CH$_3$)$_2$, 1,2-Butandiylbis(2-methyl-4,6-diisopropyl-1-indenyl)Zr(CH$_3$)$_2$, Dimethylsilandiylbis(2-methyl-4-ethyl-1-indenyl)Zr(CH$_3$)$_2$, Dimethylsilandiylbis(2-methyl-4-isopropyl-1-indenyl)Zr(CH$_3$)$_2$, Dimethylsilandiylbis(2-methyl-4-t-butyl-1-indenyl)Zr(CH$_3$)$_2$, Phenyl(methyl)silandiylbis(2-methyl-4-isopropyl-1-indenyl)Zr(CH$_3$)$_2$, Dimethylsilandiylbis(2-ethyl-4-methyl-1-indenyl)Zr(CH$_3$)$_2$, Dimethylsilandiylbis(2,4-dimethyl-1-indenyl)Zr(CH$_3$)$_2$, Dimethylsilandiylbis(2-methyl-4-ethyl-1-indenyl)Zr(CH$_3$)$_2$, Dimethylsilandiylbis(2-methyl-α-acenaphthyl-1-indenyl)Zr(CH$_3$)$_2$, Phenyl(methyl)silandiylbis(2-methyl-4,5-benzo-1-indenyl)Zr(CH$_3$)$_2$, Phenyl(methyl)silandiylbis(2-methyl-4,5-(methylbenzo)-1-indenyl)Zr(CH$_3$)$_2$, Phenyl(methyl)silandiylbis(2-methyl-4,5-(tetramethylbenzo)-1-indenyl)Zr(CH$_3$)$_2$, Phenyl(methyl)silandiylbis(2-methyl-α-acenaphthyl-1-indenyl)Zr(CH$_3$)$_2$, 1,2Ethandiylbis(2-methyl-4,5-benzo-1-indenyl)Zr(CH$_3$)$_2$, 1,2Butandiylbis(2-methyl-4,5-benzo-1-indenyl)Zr(CH$_3$)$_2$, Dimethylsilandiylbis(2-methyl-4,5-benzo-1-indenyl)Zr(CH$_3$)$_2$, 1,2-Ethandiylbis(2,4,7-trimethyl-1-indenyl)Zr(CH$_3$)$_2$, Dimethylsilandiylbis(2-methyl-1-indenyl)Zr(CH$_3$)$_2$, 1,2-Ethandiylbis(2-methyl-1-indenyl)Zr(CH$_3$)$_2$, Phenyl(methyl)silandiylbis(2-methyl-1-indenyl)Zr(CH$_3$)$_2$,
Diphenylsilandiylbis(2-methyl-1-indenyl)Zr(CH$_3$)$_2$,
1,2-Butandiylbis(2-methyl-1-indenyl)Zr(CH$_3$)$_2$,
Dimethylsilandiylbis(2-ethyl-1-indenyl)Zr(CH$_3$)$_2$,
Dimethylsilandiylbis(2-methyl-5-isobutyl-1-indenyl)Zr(CH$_3$)$_2$,
Phenyl(methyl)silandiylbis(2-methyl-5-isobutyl-1-indenyl)Zr(CH$_3$)$_2$,
Dimethylsilandiylbis(2-methyl-5-t-butyl-1-indenyl)Zr(CH$_3$)$_2$, and
Dimethylsilandiylbis(2,5,6-trimethyl-1-indenyl)Zr(CH$_3$)$_2$.

6. Composition system of claim 1 wherein the polymeric support is functionalized with an ammonium salt of a noncoordinating anion represented by the formula:

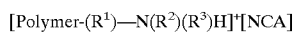

[Polymer-(R$^1$)—N(R$^2$)(R$^3$)H]$^+$[NCA]

wherein R$^1$ and where R$^1$ in formulas I or II is hydrocarbyl or substituted hydrocarbyl, R$^2$ and R$^3$ are the same or different and are selected from the group consisting of: hydrogen, hydrocarbyl, and a substituted hydrocarbyl; and wherein NCA is represented by the formula:

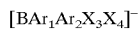

[BAr$_1$Ar$_2$X$_3$X$_4$]$^-$ wherein:
B is boron in a valence state of 3;
Ar$_1$ and Ar$_2$ are the same of different substituted-aromatic hydrocarbon radicals which, radicals may be linked to each other through a stable bridging group;
and X$_3$ and X$_4$ are independently selected from the group consisting of hydride radicals, halide radicals, hydrocarbyl radicals, substituted-hydrocarbyl radicals and organometalloid radicals.

7. The catalyst system of claim 1 wherein the support is functionalized with a ammonium salt of a noncoordinating anion selected from the group consisting of tetrakis perfluorophenyl borate, tetrakis(3,5-di(tri-fluoromethyl)phenyl borate and tetrakis(di-t-butylmethylsilyl)perfluorophenyl borate.

8. A catalyst composition comprising the reaction product of a) an aromatic polymeric support functionalized with a covalently bonded protonated ammonium salt of a noncoordinating anion selected from the group consisting of tetrakis perfluorophenyl borate, tetrakis(3,5-di(tri-fluoromethyl)phenyl borate and tetrakis(di-t-butylmethylsilyl)perfluorophenyl borate and b) one or more metallocenes selected from the group consisting of:
Dimethylsilandiylbis(2-methyl-4-phenyl-1-indenyl)Zr(CH$_3$)$_2$
Dimethylsilandiylbis(2-methyl-4,5-benzoindenyl)Zr(CH$_3$)$_2$;
Dimethylsilandiylbis(2-methyl-4,6-diisopropylindenyl)Zr(CH$_3$)$_2$;
Dimethylsilandiylbis(2-ethyl-4-phenyl-1-indenyl)Zr(CH$_3$)$_2$;
Dimethylsilandiylbis(2-ethyl-4-naphthyl-1-indenyl)Zr(CH$_3$)$_2$,
Phenyl(methyl)silandiylbis(2-methyl-4-phenyl-1-indenyl)Zr(CH$_3$)$_2$,
Dimethylsilandiylbis(2-methyl-4-(1-naphthyl)-1-indenyl)Zr(CH$_3$)$_2$,
Dimethylsilandiylbis(2-methyl-4-(2-naphthyl)-1-indenyl)Zr(CH$_3$)$_2$,
Dimethylsilandiylbis(2-methyl-indenyl)Zr(CH$_3$)$_2$,
Dimethylsilandiylbis(2-methyl-4,5-diisopropyl-1-indenyl)Zr(CH$_3$)$_2$,
Dimethylsilandiylbis(2,4,6-trimethyl-1-indenyl)Zr(CH$_3$)$_2$,
Phenyl(methyl)silandiylbis(2-methyl-4,6-diisopropyl-1-indenyl)Zr(CH$_3$)$_2$,
1,2-Ethandiylbis(2-methyl-4,6-diisopropyl-1-indenyl)Zr(CH$_3$)$_2$,
1,2-Butandiylbis(2-methyl-4,6-diisopropyl-1-indenyl)Zr(CH$_3$)$_2$,
Dimethylsilandiylbis(2-methyl-4-ethyl-1-indenyl)Zr(CH$_3$)$_2$,
Dimethylsilandiylbis(2-methyl-4-isopropyl-1-indenyl)Zr(CH$_3$)$_2$,
Dimethylsilandiylbis(2-methyl-4-t-butyl-1-indenyl)Zr(CH$_3$)$_2$,
Phenyl(methyl)silandiylbis(2-methyl-4-isopropyl-1-indenyl)Zr(CH$_3$)$_2$,
Dimethylsilandiylbis(2-ethyl-4-methyl-1-indenyl)Zr(CH$_3$)$_2$,
Dimethylsilandiylbis(2,4-dimethyl-1-indenyl)Zr(CH$_3$)$_2$,
Dimethylsilandiylbis(2-methyl-4-ethyl-1-indenyl)Zr(CH$_3$)$_2$,
Dimethylsilandiylbis(2-methyl-α-acenaphthyl-1-indenyl)Zr(CH$_3$)$_2$,
Phenyl(methyl)silandiylbis(2-methyl-4,5-benzo-1-indenyl)Zr(CH$_3$)$_2$,
Phenyl(methyl)silandiylbis(2-methyl-4,5-(methylbenzo)-1-indenyl)Zr(CH$_3$)$_2$,
Phenyl(methyl)silandiylbis(2-methyl-4,5-(tetramethylbenzo)-1-indenyl)Zr(CH$_3$)$_2$,
Phenyl(methyl)silandiylbis(2-methyl-α-acenaphthyl-1-indenyl)Zr(CH$_3$)$_2$,
1,2-Ethandiylbis(2-methyl-4,5-benzo-1-indenyl)Zr(CH$_3$)$_2$,
1,2-Butandiylbis(2-methyl-4,5-benzo-1-indenyl)Zr(CH$_3$)$_2$,
Dimethylsilandiylbis(2-methyl-4,5-benzo-1-indenyl)Zr(CH$_3$)$_2$,
1,2-Ethandiylbis(2,4,7-trimethyl-1-indenyl)Zr(CH$_3$)$_2$,
Dimethylsilandiylbis(2-methyl-1-indenyl)Zr(CH$_3$)$_2$,
1,2-Ethandiylbis(2-methyl-1-indenyl)Zr(CH$_3$)$_2$,
Phenyl(methyl)silandiylbis(2-methyl-1-indenyl)Zr(CH$_3$)$_2$,
Diphenylsilandiylbis(2-methyl-1-indenyl)Zr(CH$_3$)$_2$,
1,2-Butandiylbis(2-methyl-1-indenyl)Zr(CH$_3$)$_2$,
Dimethylsilandiylbis(2-ethyl-1-indenyl)Zr(CH$_3$)$_2$,
Dimethylsilandiylbis(2-methyl-5-isobutyl-1-indenyl)Zr(CH$_3$)$_2$,
Phenyl(methyl)silandiylbis(2-methyl-5-isobutyl-1-indenyl)Zr(CH$_3$)$_2$,
Dimethylsilandiylbis(2-methyl-5-t-butyl-1-indenyl)Zr(CH$_3$)$_2$, and
Dimethylsilandiylbis(2,5,6-trimethyl-1-indenyl)Zr(CH$_3$)$_2$.

9. A method for polymerizing olefins comprising contacting one or more monomers under suitable polymerization conditions in the presence of the catalyst compositions of claims 1 through 8.

* * * * *